United States Patent [19]

Kaufeld et al.

[11] Patent Number: 5,644,633
[45] Date of Patent: Jul. 1, 1997

[54] AUTOMATIC TELEPHONE DIALER SYSTEM

[75] Inventors: James C. Kaufeld, Freehold; Jacek Zagorski, Edison, both of N.J.; Teresa Linne Bialik; Russell Dennis Rufer, both of San Jose, Calif.

[73] Assignee: Digitran Corporation, Edison, N.J.

[21] Appl. No.: 407,504

[22] Filed: Mar. 20, 1995

[51] Int. Cl.⁶ .................................................. H04M 1/27
[52] U.S. Cl. ...................... 379/355; 379/359; 379/216
[58] Field of Search ................................. 379/355, 354, 379/216, 356, 359

[56] References Cited

U.S. PATENT DOCUMENTS

| | | | |
|---|---|---|---|
| 4,645,879 | 2/1987 | Simmons | 379/355 |
| 4,674,111 | 6/1987 | Monet et al. | 379/354 X |
| 4,802,199 | 1/1989 | Lange et al. | 379/216 X |
| 4,920,560 | 4/1990 | Kageyama | 379/355 X |
| 4,964,159 | 10/1990 | Son | 379/355 X |
| 5,241,589 | 8/1993 | Jefferson | 379/355 |
| 5,337,349 | 8/1994 | Furohashi et al. | 379/355 X |
| 5,339,357 | 8/1994 | Sawamura et al. | 379/355 |
| 5,475,743 | 12/1995 | Nixon et al. | 379/355 X |
| 5,485,513 | 1/1996 | Goedken et al. | 379/355 |

*Primary Examiner*—Krista M. Zele
*Assistant Examiner*—Devendra T. Kumar
*Attorney, Agent, or Firm*—Flehr Hohbach Test Albritton & Herbert, LLP

[57] ABSTRACT

An autodialer including a DTMF transceiver for connection between a user telephone device and the telephone line. The DTMF transceiver is connected in a double isolation mode to allow for monitoring of DTMF tones from either the telephone line or from the user telephone device. The DTMF transceiver is connected to a microprocessor for processing a plurality of program instructions stored in a memory device. The autodialer uses its program instructions to determine how to handle outgoing dial sequences. At the start of an outgoing call, the digit sequences and outgoing dial sequences. At the start of an outgoing call, the autodialer monitors the DTMF tones generated by the user telephone device looking for an intercept digit sequence. If an intercept digit sequence occurs, the autodialer hangs up on the telephone line and begins an outgoing dial sequence while continuing to capture the additional DTMF tones from the user telephone device. When the autodialer completes the outgoing sequence, it performs a cut-through to connect the user telephone device to the telephone line. If intercept does not occur, the autodialer ignores activity on the line until the start of the next call. Program language instructions (tokens) are translated into the autodialer's internal program instruction format before being transmitted to the autodialer via DTMF tones. This allows for easy remote programmability utilizing sequences of DTMF tones transmitted from the host to the autodialer. The autodialer further includes a program instruction interpreter for interpreting stored program instructions.

22 Claims, 6 Drawing Sheets

| IDS NUMBER | IDS DATA |
|---|---|
| 001 | ( [0-1][2-9] M.*){F11}, 0  (302, 304, 306, 308, 310, 312, 314, 316) |
| 002 | ( [0-1] $[0] M.*){F11}, 1  (320, 322, 324, 326, 328, 330, 332, 334) |

| LIST NUMBER | LIST DATA |
|---|---|
| 000 | 10, 11 |

*FIG. 3*

| Relative Address* | Length (bytes) | Data | |
|---|---|---|---|
| 0 | 2 | Length | 402 |
| 2 | 2 | Programming Data Version | 404 |
| 4 | 3 | Password | 406 |
| 7 | 1 | Minimum Tone time (number of t0 milisecond intervals) | 440 |
| 8 | 2 | On-hook time (number of 64 microsecond intervals) | 450 |
| 10 | 2 | IDS Pointer | 410 |
| 12 | 2 | ODS Pointer | 420 |
| 14 | 2 | Alternate 800 Number Pointer | 430 |
| 16 | 6 | List Depths (12 entries) | 500 |
| 22 | variable | List Index Tables (1 entry for each non-empty list plus one entry pointing to the byte immediately following the data in the last non-empty list) | 502 |
| | variable | List Data Structures (1 for each non-empty list) | 504 |
| | 1 | Number of IDSs | 412 |
| | 1 per IDS | IDS Length (1 for each defined IDS) | 414 |
| | variable | IDS Data (1 for each defined IDS) | 416 |
| | 1 | Number of ODSs | 422 |
| | 1 per ODS | ODS Length (1 for each defined ODS) | 424 |
| | variable | ODS Data Structures (1 for each defined ODS) | 426 |
| | 1 | Number of Alternate 800 Numbers | 432 |
| | 1 | Current Alternate 800 Number | 434 |
| | 1 per Alternate 800 Number Entry | Alternate 800 Number Digit Count (1 for each defined alternate 800 number) | 435 |
| | variable | Alternate 800 Number Entries (1 for each defined alternate 800 number) | 436 |
| 502** | 1 | Dialtone Detection Low Sample Count | 460 |
| 503** | 1 | Dialtone Detection High Sample Count | 460 |
| 504** | 1 | Dialtone Detection Low Threshold | 460 |
| 505** | 1 | Dialtone Detection High Threshold | 460 |
| 506*** | 2 | EEPROM Checksum | 480 |
| 508*** | 4 | Serial Number | 490 |

FIG. 4

LIST 0: 0231, 0574, 0841, 2159
LIST 1: 135, 146, 175, 199, 201, 203, 216, 232, 243, 264

LIST INDEX TABLE

| | |
|---|---|
| 4001 | 4124 |
| 4002 | 4129 |
| 4003 | 4129 |
| 4004 | 412B |
| 4005 | 412B |
| ••• | ••• |
| 400b | 412B |
| 400c | 412B |
| 400d | 412B |
| 400e | 412F |
| ••• | ••• |
| 4016 | 4134 |
| 4017 | 4134 |
| 4018 | 4134 |
| 4019 | 4134 |
| ••• | ••• |
| ••• | ••• |
| 4084 | 4134 |
| 4085 | 4135 |

L(0) Pointer for elements beginning with "0"
L(0) Pointer for elements beginning with "1"
L(0) Pointer for elements beginning with "2"
L(0) Pointer for elements beginning with "3"
L(0) Pointer for elements beginning with "4"

L(0) Pointer for elements beginning with "*"
L(1) Pointer for elements beginning with "0"
L(1) Pointer for elements beginning with "1"
L(1) Pointer for elements beginning with "2"

L(1) Pointer for elements beginning with "*"
L(2) Pointer for elements beginning with "0"
L(2) Pointer for elements beginning with "1"
L(2) Pointer for elements beginning with "2"

L(11) Pointer for elements beginning with "*"
End of List Pointer

FIG. 5

LIST DATA

| | | |
|---|---|---|
| 4124 | 2 | 3 |
| 4125 | 1 | 5 |
| 4126 | 7 | 4 |
| 4127 | 8 | 4 |
| 4128 | 1 | (0) |
| 4129 | 1 | 5 |
| 412A | 9 | (0) |
| 412B | 3 | 5 |
| 412C | 4 | 6 |
| 412D | 7 | 5 |
| 412E | 9 | 9 |
| 412F | 0 | 1 |
| 4130 | 0 | 3 |
| 4131 | 1 | 6 |
| 4132 | 3 | 2 |
| 4133 | 4 | 3 |
| 4134 | 6 | 4 |

LIST 0 DATA, Elements begining with "0"

LIST 0 DATA, Elements begining with "1"

LIST 1 DATA, Elements begining with "1"

LIST 1 DATA, Elements begining with "2"

End of List

FIG. 6

Alternate 800 Number 0: 18002666068
Alternate 800 Number 1: 9876543
Alternate 800 Number 0: 18002345678

| | | |
|---|---|---|
| 4200 | 3 | Number of Alternate 800Numbers 600 |
| 4201 | 0 | Current Alternate 800 Number 604 |
| 4202 | 0x0b | Alternate 800 Number "0" Digit Count 605 |
| 4203 | 7 | Alternate 800 Number "1" Digit Count 605 |
| 4204 | 0x0b | Alternate 800 Number "2" Digit Count 605 |
| 4205 | 1 \| 8 | Alternate 800 Number Entry 0  608 |
| 4206 | 0xa \| 0xa | |
| 4207 | 2 \| 6 | |
| 4208 | 8 \| 6 | |
| 4209 | 0xa \| 6 | |
| 4210 | 8 \| (0) | |
| 4211 | 9 \| 8 | Alternate 800 Number Entry 1  610 |
| 4212 | 7 \| 6 | |
| 4213 | 5 \| 4 | |
| 4214 | 3 \| (0) | |
| 4215 | 1 \| 8 | Alternate 800 Number Entry 2  612 |
| 4216 | 0xa \| 0xa | |
| 4217 | 2 \| 3 | |
| 4218 | 4 \| 5 | |
| 4219 | 6 \| 7 | |
| 4220 | 8 \| (0) | |

Alternate 800 Number Memory Architecture

FIG. 7

AUTOMATIC TELEPHONE DIALER SYSTEM

This invention relates to telephone equipment, and specifically, to an automatic dialing system for interfacing between a telephone or facsimile machine and a central telephone service.

BACKGROUND OF THE INVENTION

The present invention provides an improvement over traditional automatic telephone dialers by providing a remotely programmable interface device for screening and routing outgoing calls from a telephone or facsimile machine and executing a series of pre-programmed functions based on the outgoing dialed sequences.

Other telephone dialers are known in the art. In general, an autodialer is a device that is used to re-route telephone calls to provide customers with call routing other than their standard carrier normally provides.

Since the beginning of the telephone de-regulation, users have been given the opportunity to select long distance and local carriers for their telephone service. Often a user is required to dial a carrier access code (CAC) to access a particular carrier other than a default carrier (one of the "Baby-Bell" companies). In order to do so, the user generally has to access the ultimate carrier by dialing in a particular access code prior to the dialing of the desired local or long distance telephone number. In this way, the Local Exchange Carrier will route the particular long distance or local call to the proper carrier as designated by the particular user. However, in order to access this designated carrier, a number of bits or digits of an access code is required to be dialed for each and every long distance or local call which is desired to be carded by this alternate carder. These manual iterations are time consuming and frustrating to numerous end users, who often make use of the default carrier based on this "nuisance" factor.

Similarly, many communications customers make use of telephone services for rerouting of telephone and facsimile traffic. In order to utilize these services, a user is required to access the service, often resulting in a user entering manual dial sequences and access codes much the same as in designating an alternate carder. Thereafter, the user provides directions to the service as to their particular communications needs, again often resulting in more complicated dial sequences or verbal instructions. Any improvement to the access routines for utilizing these services would add to the overall user satisfaction with such designated telephone communication services.

SUMMARY OF THE INVENTION

It is the object of the present invention to provide a remotely programmable autodialer for interfacing between a telephone user or facsimile machine and an alternate telephone service by intercepting outgoing dialing sequences and forwarding these outgoing dialed sequences to a remote service without having to dial a carrier access code.

It is another object of the present invention to allow customers in areas not covered by a particular telecommunications service to access the same service.

It is the object of the present invention to allow customers to select a telecommunications service for a subset of their long distance or international calls.

It is a further object of the present invention to allow customers who have direct inward dial facsimile machines behind a PBX system to use the full range of a telecommunication service.

The apparatus of the present invention comprises an auto-dialer including a DTMF transceiver connected between a user telephone or facsimile machine and the telephone line. The DTMF transceiver is connected in a double isolation mode to allow for monitoring of DTMF tones from either the telephone line or from the user telephone or facsimile machine. The DTMF transceiver is connected to a microprocessor for processing a plurality of program instructions stored in a memory device (EEPROM). The autodialer uses its program instructions to determine how to handle outgoing calls. Program instructions consist of intercept digit sequences and outgoing dial sequences. At the start of an outgoing call, the autodialer monitors the DTMF tones generated by the facsimile machine or user telephone, looking for an intercept digit sequence. If an intercept digit sequence occurs, the autodialer hangs up on the telephone line and begins an outgoing dial sequence while continuing to capture the additional DTMF tones from the facsimile machine or user telephone. When the autodialer completes the outgoing sequence, it performs a cut-through to connect the facsimile machine or user telephone device to the telephone line. If intercept does not occur, the autodialer ignores activity on the line until the start of the next call. Program language instructions (tokens) are translated into the autodialer's internal program instruction format before being transmitted to the autodialer via DTMF tones. This allows for easy remote programmability utilizing sequences of DTMF tones transmitted from a host to the autodialer. The autodialer further includes a program instruction interpreter for interpreting stored program instructions in the EEPROM.

BRIEF DESCRIPTION OF THE DRAWINGS

Additional objects and features of the invention will be more readily apparent from the following detailed description and appended claims when taken in conjunction with the drawings, in which:

FIG. 3 shows the data structure for an intercept digit sequence according to the preferred embodiment of the present invention.

FIG. 4 shows the data structure stored in the autodialer for processing outgoing calls according to the preferred embodiment of the present invention.

FIG. 5 shows the data structure for a list index table according to the preferred embodiment of the present invention.

FIG. 6 shows the data structure for a list data according to the preferred embodiment of the present invention.

FIG. 7 shows the memory architecture for Alternate 800 Numbers according to the preferred embodiment of the present invention.

DESCRIPTION OF THE PREFERRED EMBODIMENT

Figure 1:
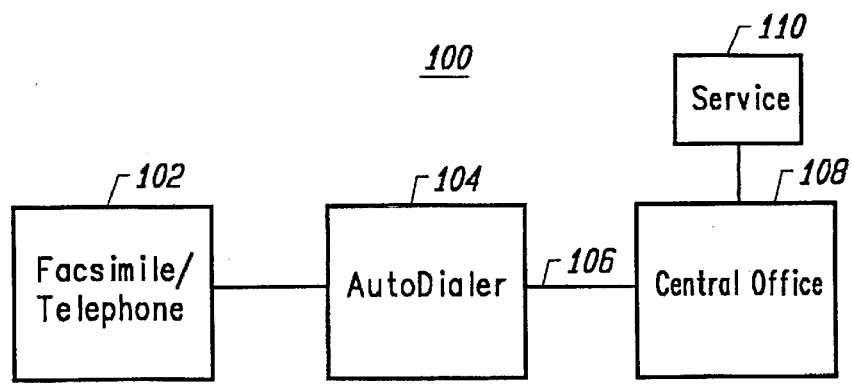
FIG. 1 is a block diagram of an autodialer system according to the preferred embodiment of the present invention.

Referring first to FIG. 1, an autodialer system 100 incorporating the teaching of the present invention is shown. The autodialer system 100 includes an autodialer 104 which is connected between a user telephone device 102, such as a facsimile machine, and the telephone line 106. The telephone line 106 connects user telephone device 102 to a local exchange carrier 108 for connection to an alternative service 110. In this configuration, calls originating from the user telephone device 102 are transmitted via the autodialer 104 to the local exchange carrier 108 for forwarding to the alternative service 110.

Typically, a user telephone device would be directly connected via the telephone line to the local exchange carder. As was described previously, in order to access an alternative service in this configuration, a user would be required to dial a carrier access code in order to inform the local exchange carrier to route a local, long distance or international call to a particular, alternative carrier. As such, in order to override the automatic carrier selection, a manual override could be performed on a call-by-call basis by dialing a specific carrier access code over-ride. By utilizing the present invention, the user is no longer required to dial a carrier access code in order to access an alternative carrier.

Figure 2:
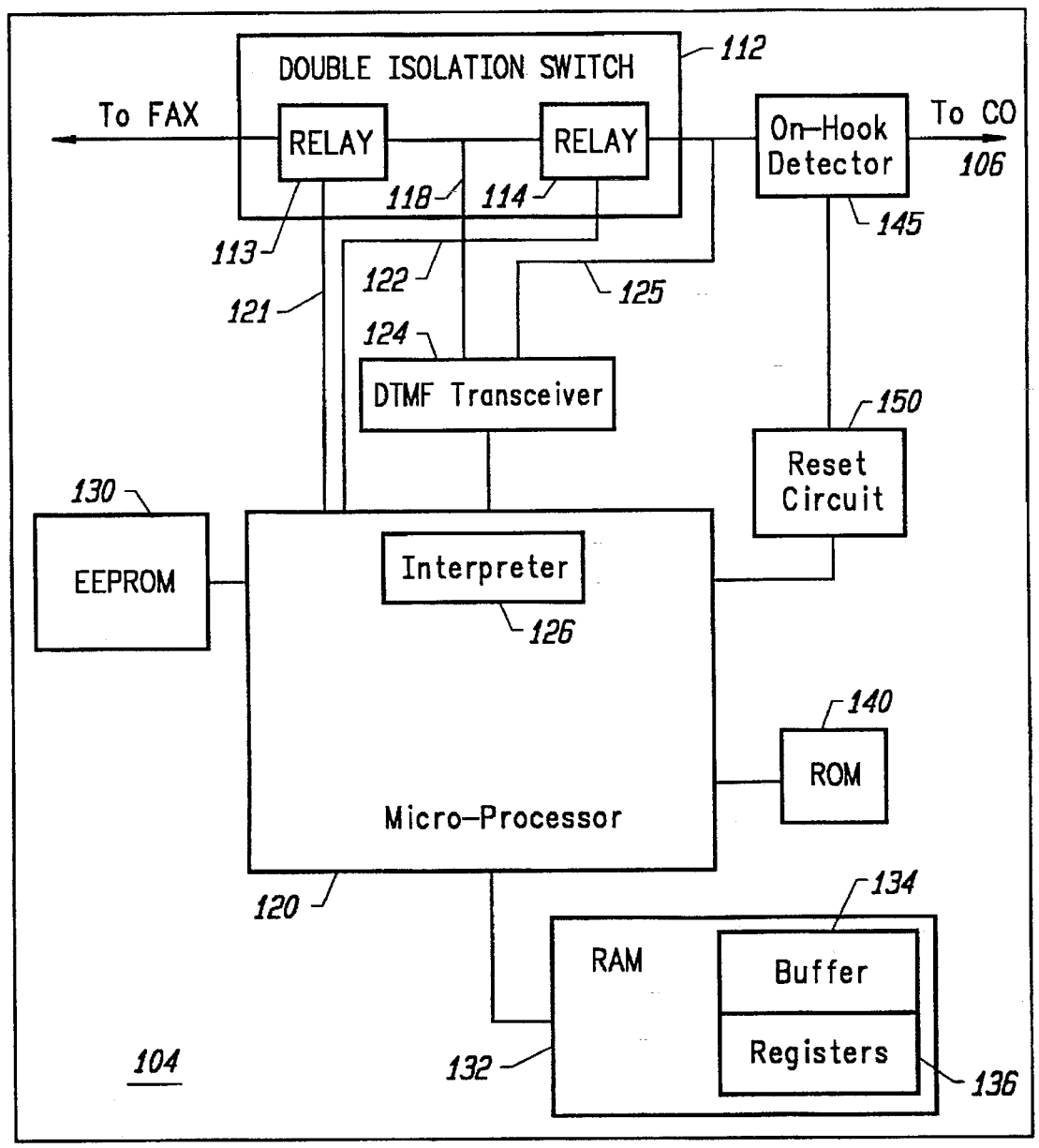
FIG. 2 is a block diagram of the autodialer according to the preferred embodiment of the present invention.

Referring now to FIG. 2, the autodialer 104 of the present invention is shown. The autodialer 104 includes a double isolation switch 112 connected between the user telephone device 102 and the telephone line 106. The double isolation switch serves to allow the autodialer 104 to listen to either the user telephone device, or to the telephone line, or both. The double isolation switch 112 includes a fax isolation relay 113 and a central office isolation relay 114. By alternatively or jointly energizing the fax isolation relay 113 and/or the central office isolation relay 114, the autodialer 104 may listen to tones generated from one or both of the central office or the user telephone device. The two relays are connected in series with a tap 118 drawn between the two relays for monitoring tones. The relays are energized by a control signal generated by a microprocessor 120 and transmitted to the double isolation switch via control lines 121 and 122.

The center tap 118 between the relays of the double isolation switch is connected to a DTMF transceiver 124. The DTMF transceiver 124 receives DTMF tones from either the telephone line or the user telephone device and translates them into a four-bit hex representation. Similarly, the DTMF transceiver receives input signals from the microprocessor 120 for output on to the telephone line via transmission line 125, converting the four-bit hex output of the microprocessor 120 into DTMF tones for transmission out the telephone line 106.

A memory device (EEPROM) 130 is connected to the microprocessor 120. The memory device 130 stores the encoded program instructions including intercept digit sequences and outgoing dial sequences associated with the autodialer system. An interpreter 126 within the microprocessor interprets the encoded stored program instructions for execution by the processor. The data structure for the interception and generation of the outgoing dial sequences will be discussed in greater detail below in conjunction with the data architecture.

A RAM 132 is connected to the microprocessor and stores temporary data structures, stack information, and other program data as required. The RAM 132 includes a buffer 134 and registers 136. The buffer 134 is used for temporarily storing incoming digits received as part of an outgoing telephone call generated by the user telephone device 102. The buffer allows for the temporary storage of digits while the processor performs interception routines. The registers 136 are used by the various interception routines to store incoming digits during the intercept process. The use of the buffer and the registers will be explained in greater detail below in conjunction with the intercept dialing sequences.

A ROM 140 is connected to the microprocessor for storing the control program associated with the autodialer 104.

In the preferred embodiment, microprocessor 120 is a Motorola processor part number HC11E9. This microprocessor includes a built in EEPROM, ROM, and RAM structure. For clarity purposes only, these elements have been shown as separate elements in the figures. Those ordinarily skilled in the art will recognize that either an integrated or separate architecture may be utilized without departing from the spirit of the present invention.

An on hook detector 145 is connected between the double isolation switch 112 and the telephone line 106. The on-hook detector is used to determine on-hook and off-hook conditions for the telephone line 106. The on-hook detector 145 is coupled to a reset circuit 150, which in turn has an output coupled to the microprocessor 120. The reset circuit provides a reset pulse to the microprocessor upon the user telephone device going off-hook, signalling the begin of a outgoing call.

The autodialer 104 uses program instructions to determine how to handle outgoing telephone calls. Program instructions consist of intercept digit sequences and outgoing dial sequences. An intercept digit sequence consists of combinations of pre-programmed digit sequences which the autodialer compares with the DTMF digits from the outgoing call in order to determine if an intercept condition arises. If an intercept occurs, the autodialer hangs up on the telephone line, then begins an outgoing dial sequence, while continuing to capture the additional DTMF tones from the user telephonic machine.

An outgoing dial sequence consists of combinations of pre-programmed digit sequences, the incoming intercept sequence or subset thereof and commands to the autodialer to go off hook on the telephone line, monitor the telephone line for various DTMF tones or the dial tone, wait a number of seconds, and/or to perform a cut-through. When the autodialer completes the outgoing dial sequence, it performs a cut-through to connect the user telephone device to the telephone line. If an intercept does not occur, the autodialer 104 ignores activity on the line until the start of a next call. The data structure associated with the autodialer 104 will be described in greater detail below.

INTERCEPT DIGIT SEQUENCES

The data structure for the autodialer 104 consists of a combination of intercept digit sequences (IDS) along with outgoing dial sequences (ODS). In the preferred embodiment, the EEPROM (130) stores up to eight IDS for processing by the microprocessor 120 allowing for up to eight intercept sequences to be stored in the EEPROM at one time.

An intercept digit sequence is comprised of one or more intercept expressions (IEs) that are used to describe digits, sequences of digits, or commands for execution by the autodialer. Each intercept digit sequence definition consists of a series of IEs followed by a ", N" where N indicates the outgoing dial sequence to execute if an IDS match is detected. Table 1 shows a listing of the various intercept expressions that are recognized by the autodialer 104 of the preferred embodiment of the present invention.

As was described previously, an intercept digit sequence comprises a sequence of intercept expressions for processing by the microprocessor 120. As an outgoing call is placed from the user telephone device 102, the microprocessor 120 receives each DTMF digit associated with the outgoing call and executes each intercept digit sequence. The microprocessor 120 will begin the execution of the first intercept digit sequence, executing the intercept expressions associated therewith, in order to determine whether or not a match has occurred in this intercept digit sequence. Thereafter, the microprocessor will, on a digit by digit basis, process each digit against each intercept digit sequence stored in the EEPROM (130).

For example, each DTMF digit translated by the DTMF transceiver 124 will be processed by the microprocessor 120 causing the sequential execution of the intercept expressions associated with each intercept digit sequence. The first intercept digit sequence may direct the microprocessor to store the DTMF translated digit in a register, or may direct the microprocessor to make a comparison between the DTMF digit received and a designated DTMF digit. The microprocessor 120 will perform the intercept expressions associated with this first IDS until either a match condition arises, a non-match or non-intercept condition arises, or until the IDS requires the processing or receipt of another digit for comparison. If a match condition arises, then the microprocessor will execute the outgoing dial sequence associated with the intercept digit sequence as will be described later. If no match occurs, then the microprocessor will invalidate the intercept digit sequence for this particular outgoing call and no longer perform any examination of incoming digits with this particular IDS. Finally, if the intercept digit sequence requires another digit for processing, the microprocessor stays the processing of this intercept digit sequence and thereafter sequentially executes the remainder of the intercept digit sequences, again performing a check of whether a match has occurred, no intercept has occurred or whether or not another digit is required. The microprocessor 120 will continue in this process, processing incoming data digits by sequentially executing each of the intercept digit sequences in order from IDS-1 through IDS-8 seeking to obtain a match or no-match condition for a given outgoing telephone call.

TERMINATION INTERCEPT EXPRESSIONS

A number of special intercept expressions exist that indicate the termination of a particular IE or the storage of information in a register or the termination of an entire IDS. Whenever a termination IE is used to end an entire IDS and the termination condition occurs before the match IE, then the IDS does not match and becomes inactive. There are four particular types of termination IE's as shown in Table 2.

Termination IE's can be used to end a register or an entire IDS. When positioned at the beginning of an IDS, a termination IE applies to the entire IDS. When positioned after a register, the termination IE applies to that particular register. As is shown in Table 2, termination IE's may be based on the number of characters that have been stored in a register or processed by the entire IDS, or upon the match of a particular digit, upon a timer expiration, or upon the receipt of a digit during a timed period. In addition, a series of termination sequences may be designated wherein the occurrence of one or more termination sequences will cause the end of the IDS. In the preferred embodiment for a given IDS, only one of the termination timers may be active at any time. Therefore, if the IDS termination timer is interrupted by one of the other timers which are available [i.e., a register termination timer or "no-digit timer"] the termination timer will be re-set to it's base value when it regains control. If a register termination timer expires before the register is complete, it is treated just as if an IDS termination timer has expired. In one embodiment, the expiration of an IDS timer indicates that the IDS has failed or ended, depending on it's location in the IDS string.

An intercept digit sequence may begin with the termination IE that tells the autodialer how to determine whether the entire intercept digit sequence has been completed. Each IDS has a default timeout which establishes a pre-defined termination for the given sequence. However, any of the default terminations may be overwritten by providing a particular termination sequence as an IE in the IDS.

For purposes of an example, FIG. 3 shows two IDS stored at IDS location 001 and IDS location 002 in the EEPROM (130) for processing by the microprocessor 120. The IDS stored at location 001 allows for the intercepting of domestic long distance telephone calls by the service 110. The IDS stored in location 002 allows for the intercepting of international telephone calls. Upon the initiation of an outgoing call by the user telephone device 102, the on-hook detector 145 will detect the off-hook condition on the telephone device, causing the reset circuit 150 to generate a reset signal for resetting the microprocessor 120. Upon receipt of a first DTMF tone from the user telephonic device, the microprocessor 120 will process the first digit received against the intercept digit sequence number 01.

As is shown in FIG. 3, intercept digit sequence 001 comprises a register storage designator 302 for indicating that the enclosed portion of the intercept expression (IE) bounded between the parenthesis is to be saved in a register by the microprocessor 120. The first IE 304 indicates that for this particular IDS, the first digit processed must be either a "0" or "1", otherwise a non-match condition will arise. A second IE 306 indicates that the second digit to be captured is any digit between DTMF tone "2–9". Upon the occurrence of either a "0" or "1" followed by a digit "2–9" then a match will occur. This is indicated by the match IE 308 which follows the second IE 306. The ".*" IE (310) indicates acceptance of 0 or more occurrences of any DTMF digit (0–*). This IE allows the IDS to accumulate data in a register until the termination sequence for this IDS is invoked. The right most ")" symbol 312 is the boundary for the first storage command initiated by IE 302. The values are stored in register 1 since this is the first occasion of a storage instruction in this IDS. In the preferred embodiment, up to 5 registers may be referred to in an IDS for storage of information; however no nested storage instructions are allowed.

Register Termination IE 314 indicates that after 11 digits are received, the storage of digits associated with the initial register storage IE 302 will be terminated. Upon the termination of the register storage, the microprocessor will process the next IE, command, etc. in the IDS. In this example, the microprocessor will execute outgoing dial sequence (ODS) "0" as indicated by designator 316. In summary, this IDS begins to store digits in register 1, initially seeking a match in the first two digits of a "0" or "1" followed by any digit "2–9". Thereafter the microprocessor 120 will continue to store digits until 11 digits are received from the outgoing call, and upon the storage of those numbers, will execute the ODS number "0" as indicated by the ODS selection at location 316.

IDS number 002 shown in FIG. 3 includes a first storage register designator 320 which indicates that this IDS upon processing will begin to store numbers in its associated register number 1, followed by a first IE 322 (which requires the first digit received from the DTMF transceiver to be a "0" or "1"). A second IE 324 requires that upon receiving the first digit of a "0" or "1", the next series of digits should be compared to the elements defined in List "0" as designated by the list designator associated with this IE. In the preferred embodiment, the list designator N allows for a match to occur between any of the entries in the list.

A list is a set of strings, each of which is a simple sequence of DTMF digits, with each element in the list having the same number of digits. List numbering begins with "0". In the preferred embodiment, the list IE cannot occur after a match IE.

The match IE 326 follows the list IE 324 indicating that upon the occurrence of the sequence of "0" or "1" followed by a match within the list 0 as defined by IE 324, then a match or intercept will occur. The IDS is again completed with a ".*" IE 328, a register termination IE 330 indicating that storage will terminate after 11 digits are stored, and finally, an ODS designation 332 which indicates that upon the intercept of the match sequence defined by this IDS, then ODS number 1 will be executed.

For the purposes of example, assume that an outgoing telephone call has begun to be issued by the user telephonic device 102 for transmission to the autodialer 104. The autodialer 104 whose default configuration of its double isolation switch 112 allows the autodialer to listen to the telephone line and the user telephonic device, will detect the off-hook condition. Upon the receipt of the first DTMF tone from the user telephonic device, the autodialer monitors the DTMF tones looking for a match or an intercept based on the intercept digit sequences stored in it's EEPROM (130). For the purposes of example, assume that the first DTMF digit received by the autodialer is a "0" digit. In this case, the microprocessor will receive the "0" digit decoded by the DTMF transceiver and pass the value to the microprocessor for evaluation against the IDS's. The microprocessor will first look at IDS 001. In our example, IDS 001 provides for the storage of the DTMF tone value as indicated by the IE 302. The microprocessor will store in register 1 this DTMF tone value. Thereafter, the microprocessor will process IE number 2 (304) to determine whether or not this particular DTMF digit is a "0" or "1". Because the sample DTMF digit is a "0", the first IE has been satisfied for this IDS. The microprocessor will look at the next IE and upon determining that the next IE requires another digit input, will leave this IDS process pending and will evaluate the second IDS based on this first DTMF digit received.

Again, in IDS 002, a first register will store the value associated with the DTMF digit and the microprocessor will begin by processing the first IE 322 associated with IDS 002 and determine that, again the first IE is satisfied, because the first digit tone received was a "0". The microprocessor will look ahead to the next IE in the string and determine that another DTMF digit is required in order to continue to process this particular IDS.

The microprocessor will continue in this fashion, evaluating the IDS's in sequential order to determine whether or not a particular match or no-match situation has arisen, or whether more digits are required to be processed (a wait condition). In the event that a no-match condition has arisen, then the microprocessor will invalidate this IDS for the given outgoing call and thereafter, not process this IDS based on the remaining incoming DTMF digits received.

For the purposes of example, assume that the second DTMF digit received is a "1". Upon receipt of the second digit, the IDS will again begin by processing IDS 001. In looking at the next IE for processing associated with IDS 001, it will determine that this IDS is invalid or non-matched. This is because the second IE requires that a next DTMF digit be within the range of 2-9 as required by IE 306. Because the match did not occur before this time, IDS 001 will be deemed invalid for the remainder of this outgoing call.

The microprocessor will next process IDS 002 looking at the next IE for processing comparing the received digit against values stored in List "0" according to List IE 324. Let's suppose, for the purposes of our example, that the list designated "0" associated with IE 324 includes the values of "10" and "11", requiring two digits to determine if this IE will be satisfied. The microprocessor will store this first digit in a register, waiting for the second digit so as to complete the comparison with List "0". If for example the second digit received was a 9, then the microprocessor would automatically determine that this IE is not satisfied, since no elements in List 0 begin with the digit 9. Accordingly the microprocessor would invalidate this IDS for the remainder of this outgoing call.

The microprocessor would continue in this manner, processing each of the remaining valid IDS's utilizing the second input digit. Upon receipt of a third input digit, the microprocessor would begin by processing the next IE in IDS 002 (since IDS 001 has ben determined to be invalid). Assuming that the third digit received was a "1", then the List IE 324 (which is the current IE for processing in IDS 002) would be satisfied (based on the second and third digit sequence 11 match with List "0" element number 2). The microprocessor would thereafter look forward to the next IE for processing. In this example, IDS number 002's next IE is the match IE 326. The match IE indicates that upon the satisfaction of the previous IE's then a match or intercept condition has arisen. Upon the occurrence of a match condition, then the IDS will continue to execute IE's in order and eventually indicate an outgoing dial sequence to be executed by the microprocessor. For the purpose of our example, the microprocessor will continue to store up to 11 characters in its register (based on the register termination sequence 332) and thereafter, the microprocessor will execute ODS number 1 according to the ODS designator 334.

MULTIPLE MATCHES

If the autodialer has multiple digit sequences that match the incoming digit stream, the autodialer uses whichever intercept digit sequences reaches the match character M in the fewest number of digits. If more than one IDS would achieve the match on the same digit, the IDS which was defined first in the EEPROM location will be used.

As described previously, the maximum number of IDS's in the preferred embodiment is eight. Those ordinarily skilled in the art will recognize that the number of IDS's stored by the EEPROM could be increased to a number greater than eight based on the storage requirements available. The number of IDS's selected or the number of ODS's should not be construed as limiting. In the preferred embodiment, an IDS can accept a maximum of 100 incoming digits for processing. Any subsequent digits received will be discarded.

LISTS

A list is a series of DTMF digit streams consisting of digits "0-*". In the preferred embodiment, the maximum number of lists per autodialer is 12. In addition, the maximum number of lists that can be active within the autodialer at one point in time across all of the IDS's is eight. Note that it is possible for more than eight lists to be defined across the collection of all of the IDS's, but no more than eight lists can be active simultaneously at run time. Those ordinarily skilled in the art will realize that this is due to real time and memory constraints and that more lists or active lists could be utilized by implementing a larger memory scheme or a faster processor environment.

For each list, the number of digits in every list element will be uniform, that is, each element in a given list shall have the same depth. In the preferred embodiment, the maximum list depth is 10 digits with a minimum list depth of two digits. As is shown in Table 1, the list IE may designate more than one list for comparison, with each list in a grouping of any depth configuration.

OUTGOING DIAL SEQUENCES

As described previously, upon a match or intercept of an IDS, the particular IDS will designate an outgoing dial sequence (ODS) for execution. Outgoing dial sequences consist of combinations of pre-programmed digit sequences, the incoming intercept sequence or subsets thereof (stored in registers), and commands to the autodialer to go off hook on the telephone line, monitor the telephone line for various tones, wait a number of seconds (or milliseconds) and/or to perform a cut-through.

The outgoing dial sequence (ODS) is comprised of one or more outgoing expressions (OEs). Table 3 describes the list of various outgoing expressions which are available in the preferred embodiment of the present invention. When an IDS matches an incoming digit stream, the associated ODS is used to send DTMF digits and control sequences on the telephone line. In the preferred embodiment, the maximum number of ODS's is eight.

ALTERNATE 800 NUMBERS

One particular type of OE indicates that the microprocessor should dial an alternate "800" number. The alternate "800" number feature allows the user to designate a series of alternate telephone numbers for execution upon the unavailability of a primary telephone number to the service 110. In the preferred embodiment, the alternate "800" feature is used when the "800" number associated with the service 110 is unable to return the dial tone to the autodialer 104. In this way, the autodialer may execute an alternative telephone number for accessing the service 110 and not require the user to manually enter in a new telephone number for the service. The alternate "800" number feature includes a list of alternate "800" numbers to be stored in the EEPROM (130) along with a pointer indicating the starting address of the alternate "800" list, as well as a pointer to the current alternate "800" number. In the preferred embodiment, the alternate "800" number feature is executed by the microprocessor upon the occurrence of the OE in the outgoing dial sequence. A user desiring to allow for an alternate "800" number, may include this OE in the outgoing dial sequence and upon the inability to achieve a connection to the service 110, the microprocessor will execute an alternative dialing sequence as designated by the alternate "800" number.

In the preferred embodiment, the alternate "800" number list is a series of 0–255 alternative telephone number sequences for dialing by the microprocessor. In operation, the pointer for the current alternative "800" number indicates the location in the memory of the EEPROM (130) at which the current alternative "800" number is located. If the OE for the alternate "800" number feature is included in the outgoing dial sequence, then upon the failure of a connection to the service 110, the number indicated by the pointer for the current "800" alternative number will be dialed by the microprocessor 120.

Those ordinarily skilled in the art will realize that the alternative "800" number feature provided for in the autodialer allows for the designation of 0–255 different alternative telephone numbers to dial in a list according to the alternate "800" listing. The pointer for the first listing of the alternate "800" numbers, along with the pointer for the current alternate "800" number may be manipulated to provide a user with the ability to dial an initial number followed by a sequence of alternative numbers in the event that the initial number or any of the alternative numbers fails to provide a connection for the user. While in the preferred embodiment, this feature has been described in relationship to an alternate "800" number, those ordinarily skilled in the art will realize that any number may be programmed and that an "800" series number is not necessarily required.

AUTODIALER DOWNLOADING

In order to program the autodialer, a remote programming feature may be implemented or the EEPROM associated with the autodialer may be removed for ease of programming. In the remote programming mode, the programming instructions are sent to the autodialer via a host located at the service 110 using DTMF tones. The autodialer down loading process begins by the host placing a call through to the user telephone device, which in turn answers the call. The host upon pick-up, transmits a PROGRAM REQUEST command in the form of a DTMF tone. As was described previously, the autodialer 104 is configured in the ready state with its double isolation switch configured to allow for the DTMF transceiver to monitor DTMF tones coming from either the telephone line 106 or the user telephone device 102. As such, upon the transmission of the PROGRAM REQUEST command, the autodialer recognizes the command and isolates the user telephone device via the fax relay 113. In this way the DTMF transceiver connected to the double isolation switch is only configured to monitor DTMF tones received from the host service 110. Thereafter, the autodialer is ready to begin to process the downloading of program instructions. In the preferred embodiment, the PROGRAM REQUEST command to the autodialer 104 is in the form of a single DTMF digit value 0 hex (DTMF digit D). The use of a fourth column DTMF digit for PROGRAM REQUEST is a simple means to provide for an identifiable command while minimizing confusion by not using the more frequently used DTMF digits "0–*".

The autodialer will thereafter respond with a READY TO PROGRAM response to indicate that the isolation from the user telephone device has been achieved. In a preferred embodiment the READY TO PROGRAM response sent from the autodialer consists of two DTMF digits having a hex value of 24.

The host thereafter will send the particular autodialer's PASSWORD down to the autodialer in order to verify that a proper host is connected to the autodialer. In the preferred embodiment this particular means of security is to assure that the autodialer is not reprogrammed by another host, thereby maintaining program instruction integrity. In the preferred embodiment autodialer passwords are six digits long. Each individual autodialer will have a unique password, allowing up to $6^{16}$ different autodialer password configurations. The autodialer passwords are sent as DTMF digits from the host to the autodialer 104. If the password is correct the autodialer responds with a PROGRAM MODE response. If the password is incorrect, the autodialer waits several (e.g. 30) seconds, then goes on hook for the configured on hook time, hanging up on the host, then releases the line to the control of the user telephone device 102, which will hang up on the line. In the preferred embodiment, a 30 second wait period is utilized as a security measure to prevent the unauthorized users from discovering the password.

In the event that the EEPROM associated with the autodialer is corrupt, a default password has been defined in the preferred embodiment. The autodialer 104 will respond to the default password only in the event that the EEPROM has been corrupted.

The PROGRAM MODE response indicates that the autodialer is ready to receive programming data and the host can begin transmitting such data. In the preferred embodiment, the PROGRAM MODE response from the autodialer consists of a two DTMF digit having a value of 2D (hex). The PROGRAM MODE response also includes the autodialer's serial number, a ROM code version number, the programming version number and a calculated checksum of its current programming instructions. In the preferred embodiment the serial number is eight DTMF digits, the ROM code version is four DTMF digits, the programming version number is four DTMF digits followed by the calculated EEPROM checksum which is also four DTMF digits.

If the autodialer does not respond with a PROGRAM MODE response, the host may be sending an incorrect password or the autodialer may have a corrupted EEPROM. The autodialer considers the EEPROM to be corrupted if it's calculated EEPROM checksum does not match its stored EEPROM checksum. In this case the host may hang up and try the download again using the default autodialer password to initiate downloading. The default autodialer password is stored in ROM and is only valid if the EEPROM is corrupted. If the EEPROM is not corrupted, the autodialer does not respond to the default autodialer password. In the preferred embodiment, a jumper has been provided inside the autodialer to allow intentional corruption of the EEPROM checksum. By setting the jumper and going off hook, the autodialer is forced to add a 1 to the high byte of its EEPROM checksum thereafter invalidating the checksum.

Upon receipt of the PROGRAM MODE response by the host, the host will generate a PROGRAM DATA BLOCK command which consists of a header followed by data. The header consists of the starting address in the EEPROM for the new data and size of data block to be transferred. The data itself should contain a new version number for the new programming instructions, and could contain a new password. In the preferred embodiment, the data for the PROGRAM DATA BLOCK consists of the offset in the EEPROM to store the data, the number of bytes of data followed by the data itself. In the preferred embodiment the EEPROM offset is four DTMF digits which indicates a range of values of 0 to 501 relative address locations. The number of data bytes is two DTMF digits long indicating 1 to 255 different data bytes which will be transmitted. Finally the EEPROM data itself consists of a sequence of single byte (two nibble) data words. The data structure associated with the programming will be described in greater detail below in conjunction with the interpreter.

After the programming data is sent, the autodialer performs a checksum and transmits a PROGRAM DATA BLOCK ACKNOWLEDGE back to the host. In the preferred embodiment the PROGRAM DATA BLOCK ACKNOWLEDGE is a two digit DTMF response having a value of 21 (hex). If the checksum returned from the autodialer is good, the host will tell the autodialer to write the data into the EEPROM. This is done by sending an EEPROM WRITE command from the host to the autodialer. In the preferred embodiment the EEPROM WRITE command is a two DTMF digit command having a value of 11 (hex).

Upon receipt of the WRITE EEPROM command from the host, the autodialer moves the programming instructions into its EEPROM. If the checksum is bad, the host can resend the programming header and data or hang up and perform the programming instructions call again.

Because the EEPROM memory is larger than the available RAM memory in the preferred embodiment, downloading requires sending the data in sections, with checksums on each section. When the autodialer finishes loading a section of programming instructions in the EEPROM, it sends a confirmation to the host that the EEPROM has been written (EEPROM WRITTEN). In the preferred embodiment the EEPROM WRITTEN response is a two digit DTMF response having a value of 22 (hex).

Upon receipt of the EEPROM WRITTEN response from the autodialer, the host can send the next section of data or complete the transaction. When the host is finished sending all the data sections, it tells the autodialer that downloading is complete. In the preferred embodiment, the host sends a DOWNLOAD COMPLETE command that is a two digit DTMF response having a value of 12 (hex). In response, the autodialer calculates the new checksum for the EEPROM and responds with a DOWNLOAD COMPLETE ACKNOWLEDGE response back to the host. In the preferred embodiment the DOWNLOAD COMPLETE ACKNOWLEDGE response is a two digit DTMF response having the value of 23 (hex). The DOWNLOAD COMPLETE ACKNOWLEDGE signal also includes a version number and the new calculated checksum for the current programming instructions.

When the host is ready to conclude the call, it sends a LOGOUT message to the autodialer. In the preferred embodiment, the LOGOUT command is a two digit DTMF command having the value of 13 (hex). Upon receipt of the LOGOUT message the autodialer goes on hook for the configured on hook time, hanging up on the host, then releases the line to the control of the user telephone device, which will hang up on the line. In the preferred embodiment during the download sequence, a multi-second (e.g. 30 seconds) timer is used to ensure that a break in transmission will not result in a hung condition. The timer is reset each time a DTMF tone is received by the autodialer. The only phase of downloading which the timer is deactivated is during the EEPROM writing. In all of the phases, a predefined multi-second span in which the host does not transmit should indicate loss of contact with the host. The timer is restarted after the EEPROM has been written, when the write confirmation is sent to the host.

TRANSLATION OF DTMF DIGITS INTO BYTES

As is described previously, the programming instructions take the form of interrupt digit sequences and outgoing dial sequences. These program instructions must be encoded for transmission via DTMF tones by a host service 110 for receipt by the autodialer 104. The autodialer, upon receipt, will translate the encoded intercept digit sequences and outgoing dial sequences by translating the DTMF characters into a four bit hex value. Accordingly, each IDS or ODS instruction which forms a part of an intercept digit sequence or outgoing dial sequence may be encoded by utilizing a combination of these hex representations. Table 4 shows a conversion table for indicating a particular IDS intercept expression and its appropriate encoded value to be transmitted via DTMF tones for remote programming of the EEPROM. Table 5 and 6 show the encoded values for the various responses and outgoing expressions for use in the data structure of the preferred embodiment of the present invention.

When the autodialer receives DTMF digits, it builds them up into eight bit bytes or 16 bit words. In the preferred embodiment, for eight bit bytes and 16 bit words, the first digit received is the most significant nibble of the most significant byte. The second digit received is the least significant nibble of the most significant byte and so on. For 16 bit words the third digit received is the most significant nibble of the least significant byte and the fourth digit received is the least significant nibble of the least significant byte.

AUTODIALER CHECKSUM

The autodialer checksum consists of a 16 bit number, which is the CRCCCITT checksum of its programming instructions. The autodialer will recalculate this value whenever new program instructions are downloaded. In addition, each time the autodialer powers on, which occurs at the beginning of each call, the EEPROM checksum will be calculated and compared with the stored checksum. If the checksum is incorrect, the autodialer will not intercept calls since the EEPROM has been corrupted. If the checksum is incorrect, the autodialer password is probably also incorrect. In this case if the host wishes to download program instructions to the autodialer, the host must use the default password, which is stored in the autodialer ROM.

EEPROM ARCHITECTURE

Referring to FIG. 4, the structured format for the EEPROM is shown. The EEPROM image format includes a two byte length field designating the length used in the EEPROM storage area 402, a programming data version field 404 for storing the current instruction version, a password field 406 for storing the password associated with the particular autodialer, along with information about ODSs, IDSs, lists and the alternate "800" number feature.

The data structure for the EEPROM includes a list depth field 500 defining up to 12 depths, one for each of the up to 12 lists to be stored in the EEPROM associated with intercept expressions. The list depth field 500 is six bytes in length and includes a designator for the 12 lists. A list index table field 502 is included. The list index table includes a plurality of entries for each list along with an end of list pointer pointing to the last non-empty list address location. For each list the list table index includes a pointer pointing to the location in memory associated with all elements beginning with a given digit. In this way the list index table for each list includes eleven entries, one for the eleven addresses in memory associated with elements beginning with a particular digit that form a part of the particular list.

FIG. 5 and 6 show two sample lists, and a sample List Index Table and List Data associated with these sample lists. FIG. 5 includes two lists: List 0 is of depth 4 and includes the elements (0231, 0574, 0841, and 2159); List 1 is of depth 3 and includes 10 elements (135, 146, 175, 199, 201,203, 216, 232, 243, and 264). As seen in the figure, a relative address location 4001 is the first address beginning for the list index table for this example. The first data entry at address 4001 is the address associated with the elements beginning with a digit of "0" for List 0. The memory configuration for storing the data associated with List 0 is shown in FIG. 6. Starting at relative address location 4124, elements 231 followed by 574 and 841, respectively are shown.

In the preferred embodiment of the present invention, you will notice that at location 4128 in the list data, an extra "0" is stuffed because the starting location for any individual element must begin at a first byte in the data structure. As such, the pointer located at address location 4002 which indicates the location in the list data for elements that begin with a "1", starts at the address location 4129 in the list data. As can be seen from the example, where no elements in a given List 0 begin with a particular number, the pointer associated with the elements beginning with that number points to the same address location as the pointer associated with elements beginning with the previous pointer As the microprocessor processes digits received from the DTMF transceiver, an IE designating a check for a match in a list will result in the a look up in the list index table. The microprocessor will look to the starting location in memory for where the list is stored in memory. At the same time, the microprocessor will look to the next pointer to determine the number of list elements. If the next pointer indicates the same address as the address stored for the received digit, then the microprocessor knows that no elements in the list begin with the received digit. Accordingly, all of the entries at locations 4016 through 4084 include the same starting address 4135, indicating that only 2 lists are present and that the first list does not have any entries which begin with any digits greater than a "2".

Referring again to FIG. 4, the data structure for the EEPROM includes an IDS pointer 410 that indicates the beginning of the first IDS stored in the EEPROM. The IDS pointer indicates the location where the first field associated with IDSs is stored within the EEPROM. The first field associated with IDSs is the Number of IDS fields 412 which indicates the current number of IDSs stored in the EEPROM. As was described previously, up to eight IDSs may be stored in the EEPROM in the preferred embodiment of the present invention. Following the Number of IDS field 412 is an IDS length field 414, one field for each IDS that is currently stored in the EEPROM. In this way the microprocessor can determine the starting address for each individual IDS in order to process outgoing calls. After the IDS length field, the individual IDSs are provided in the EEPROM at location 416.

The EEPROM also includes an ODS pointer 420 which indicates the starting address for where the ODS instructions reside. The ODS pointer indicates the first relative address for the first field associated with ODSs. Again, the first field associated with ODS is a Number of ODS field 422. The number of ODS field refers to the total number of ODSs which are included in the data architecture. As was described previously, any number of IDSs may point to an individual ODS. As such, the number of ODSs does not necessarily have to correspond to the number of IDSs. Following the Number of ODS field 422 is an ODS length field 424 indicating the length of the individual ODSs. These length fields are followed by the ODS data structures themselves 426.

The EEPROM further includes the alternate "800" number structure including an alternate "800" number pointer 430 which indicates where in memory the alternate "800"

number data begins. The alternate "800" number data begins with the Number of alternate "800" numbers field 432 which indicates the total number of alternate "800" numbers which are currently available in the EEPROM. Following this field is a Current Alternate "800" number field 434 which indicates the current alternate "800" number from the list of alternate "800" numbers stored in the EEPROM. Next in the architecture is a plurality of Digit fields 435, one for each alternate 800 number stored in the EEPROM. The Digit field stores the number of digits in the particular alternate 800 number. Following the Digit fields are the actual data fields 436 associated with the alternate "800" listings.

Referring now to FIG. 7, the memory format for storing alternate "800" numbers is shown. For the purpose of example, three alternative "800" numbers are defined: alternate "800" number 0 (1-800-266-6068), alternate "800" number 1 (987-6543), and alternate "800" number 2 (1-800-234-5678). As was described previously, the first field associated with the alternate "800" numbers is the number field 600 which describes the total number of alternate "800" numbers available in the EEPROM. For the purpose of this description, the data stored at the address location 4200 associated with this field is "3". A second field 604 includes a pointer indicating the current alternate "800" number which is to be selected by the microprocessor in the event that the alternate "800" number routine is exercised. The third data field 605 includes a digit count for each alternate "800" number included in the EEPROM. The digit count field 605 indicates a hex value for the total number of digits in each respective alternate "800" number. For the purposes of this example, address location 4202 and 4204 have a hex value stored of "b" indicating that there are 11 digits in the alternate "800" number which are stored in the EEPROM for these respective entries. Alternatively, address location 4203 includes a hex value of "7" indicating that there are 7 digits associated with alternate 800 number 1 stored in memory.

Finally, after the digit count field 605, the alternate "800" number entry 0 is found in field 608. In the preferred embodiment, the EEPROM data structure includes a two nibble byte for each memory location, and as such, two digits may be stored at each memory location. Accordingly, address location 4205-4210 are utilized to store entry 0 of the alternate "800" number. Address location 4211 begins with the first digit for the alternate "800" number entry number 1 and continues through address location 4214.

Finally, the data associated with alternate "800" entry number 2 begins at address location 4215 and continues through address location 4220.

Referring back to FIG. 4, the EEPROM data structure also includes a minimum tone time field 440 for designating the minimum amount of time that the dial tone is detected before dial tone detection is considered. Similarly, an on hook time field 450 designates how long an on-hook condition lasts as controlled by the microprocessor. The EEPROM also includes dial tone detection parameters 460, qualifying how many samples a dial tone detector in the autodialer will take as well as the threshold levels desired for defining the existence of a dial tone on the telephone line.

At the end of the EEPROM are two additional fields, the EEPROM checksum field 480 which is two bytes in length and the serial number field 490 which is four bytes in length.

In the preferred embodiment, a relative addressing scheme is utilized whereby a relative address offset from the base address of B600 hex is utilized. Thereafter based on various pointers that exist in the data structures, individual elements for IDS or ODS or alternate "800" numbers may be identified by their relative address locations. Those ordinarily skilled in the art would recognize that the 512 byte EEPROM storage structure defined may be expanded to other EEPROM sizes allowing for the same general relative addressing scheme to be utilized. The use of IDS, ODS, alternate "800" number pointers along with numbers of fields for each of the IDSs, ODSs, and alternate "800" numbers allows for the relative addressing of all of the programming instructions for easy access by the host. As described previously in the autodialer downloading program, the host may access any individual portion of the EEPROM and program that EEPROM portion by designating the offset for the EEPROM address at which the load is to begin.

ALTERNATIVE EMBODIMENTS

While the present invention has been described with reference to a few specific embodiments, the description is illustrative of the invention as not to be construed as limiting the invention. Various modifications may occur to those skilled in the art without departing from the true spirit and scope of the invention as defined by the appended claims. In one alternative embodiment, the autodialer of the present invention may be integrated with the user telephone device to form a single telephonic device.

TABLE 1

| Intercept Expressions | |
|---|---|
| A DTMF digit (0, 1, 2, 3, 4, 5, 6, 7, 8, 9, #, \*) | A DTMF digit (0, 1, 2, 3, 4, 5, 6, 7, 8, 9, #, \*) is a one character IE. Note that \* is used to represent the DTMF digit '*'. |
| "." | "." is a one character IE that matches any DTMF digit. |
| IE* | Any one character IE followed by a * will match upon 0 or more occurrences of that IE. |
| IE+ | Any one character IE followed by a + will match upon 0 or 1 occurrences of that IE. |
| [x-y] | [x-y] is a one character IE that matches any DTMF digit in the range between x and y. Note that the complete rage of DTMF digits is: [0-\*]. |
| [xy . . . ] | [xy . . . ] is a one character IE that matches any DTMF digit included in the set {x,y, . . . }. |
| M | M indicates that point in an IE where, if a match has occurred, the Autodialer should begin the associated Outgoing Dial Sequence, while continuing to capture incoming digits. Once a match has be,n determined, the remainder of the matching IE becomes a filter for incoming DTMF digits. |
| $[n] | $[n] is an IE that matches any string in List n. A List is a set of strings, each of which is a simple sequence of DTMF digits, with each element in the List having the same number of digits. List numbering begins |

TABLE 1-continued

Intercept Expressions

| | |
|---|---|
| | with 0. The List IE cannot occur after the match IE (M). |
| $[n,m, ... ] | $[n,m, ... ] is an IE that matches any string in List n or List m, The number of digits in the list elements may differ across the Lists. The maximum number of Lists allowed within the square brackets is 5. |
| ( ) | A portion of an IE may be enclosed inside a parenthesis, ( ). The string matched by the enclosed portion of the IE is saved in a register whose name is the number of left parenthesis, (, since the beginning of the IE. The enclosed portion of the IE must either end in a deterministic mariner or there must be a termination IE after the right parenthesis, ). Registers cannot be nested, specifically, after a left parenthesis, another left parenthesis may not be used before a right parenthesis. These registers may be referred to in the ODS. The maximum number of registers per IDS is 5. |

TABLE 2

Termination Intercept Expressions

| | |
|---|---|
| {fNN} | {Fnn} is a termination IE which matches whenever exactly nn characters have been entered in the preceding register or the entire IDS. The range of nn is 1 through 31 digits. When {Fnn} is used to terminate the '*' IE, the concatenation becomes deterministic. |
| {E*} and {E#} | {E*} and {E#} are termination IEs that match whenever the DTMF digit * or # is entered, respectively, |
| {Tnn} | {Tnn} is a timer termination IE which matches whenever nn seconds elapses without any additional digits being entered. The range of nn is I through 31 seconds. Each time the Autodialer receives a digit, termination timing is restarted at the 10 base value, nn seconds. For example, if {T05} is used for IDS termination, the user can pause for up to 5 seconds between dialing each digit. For a given IE, all timers share a common resource; therefore, only one timer may be active at any time. If, for example, a register timer is activated, the IDS termination timer will be deactivated until the completion of the register; when the IDS timer is reactivated it will be reset to its base value. If there is no initial {Tnn} time specified for an IDS, by default, an IDS will timeout if it receives no digits within any 4 second period (equivalent to using {T04}): This will prevent the Autodialer from hanging if an incomplete phone number is dialed. |
| {IE$_1$IE$_2$} | {IE$_1$IE$_2$} is a termination IE that matches either termination IE$_1$ or termination IE$_2$. |
| {Nnn} | {Nnn} is a termination IE which causes an IDS to fail if any digit is entered within nn seconds. Th, purpose of this timer is to enforce a period of silence. The range of nn is 1 through 31 seconds. This termination IE must occur before the match character (M). This form of termination timing will be referred to as "no digit timing". Following is an example using the {Nnn} IE: |

TABLE 3

Outgoing Expressions

| | |
|---|---|
| A DTMF digit (0, 1, 2, 3, 4, 5, 6, 7, 8, 9, #, \*, A, B, C, D) | A DTMF digit (0, 1, 2, 3, 4, 5, 6, 7, 8, 9, #, \*, A, B, C, D) is a one character OE. Note that \* is used to represent the DTMF digit '*' and A, B, C, nd D, represent the fourth-column DTMF tones. |
| H | H is an OE that means go on-hook on the telephone line. |
| K | K is an OE that means go off-hook on the telephone line, and wait for dialtone, beep tone, or bong tone before proceeding. The Autodialer looks for audible power on the telephone line, which indicates it is receiving a tone. If dialtone is not detected within 30 seconds, the Autodialer will cut the call through to the FAX machine. When the FAX machine times out waiting for FAX tone, it will hang up on the line. |
| X | X is an OE that means cut the call through between the FAX machine and telephone line and ignore all further activity until the call is over. |
| Rn | Rn is an OE that means output the digits collected in register n of the intercept IE. |
| Wnn | Wnn is an OE that means wait for nn seconds before proceeding. The range of nn is 1 through 15. |
| Snn | Snn is an OE that means wait for nn times 50 milliseconds before proceeding. The range of nn is 1 through 15, where 1 indicates a wait of 50 millisecond, and 15 indicates a wait of 750 milliseconds. |
| T | T is an OE that means go off-hook on the telephone line, and wait for dialtone, beep tone, or bong tone before proceeding. If the Autodialer does not detect dialtone within 30 seconds, it increments the Current Alternate 800 Number (wrapping to 0 if it equals the Number of Alternate 800 Numbers), and writes the new value to EEPROM. It also updates the EEPROM checksum, and performs a cut-through. If the Autodialer does detect |

TABLE 3-continued

Outgoing Expressions

| | |
|---|---|
| | dialtone, it stores the length of time it took to detect dialtone (in seconds) in the variable Dialtone Acquisition Length. The minimum length of time that a tone must be present, Minimum Tone Time, is a configuration expression. If the Number of Alternate 800 Numbers is 0, this OE can still be used to update Dialtone Acquisition Length. |
| N | N is an OE that means dial an Alternate 800 Number, using the Current Alternate 800 Number. |
| Gnn | Gnn is an OE that means go off-hook on the telephone line, and wait for a DTMF command digit, before proceeding. If the Autodialer does not receive a DTMF digit within nn times 50 milliseconds, it continues to the next token. If the Autodialer receives a DTMF digit, it Processes the command. The range of nn is 1 through 15. |

TABLE 4

Intercept Digit Sequences - Encoded

| Instruction | Match DTMF Tones | | | | Data | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 1) 1 Occurrence of a DTMF tone | 0 | 0 | 0 | 0 | # | * | 9 | 8 | 7 | 6 | 5 | 4 | 3 | 2 | 1 | 0 |
| 2) 0 or 1 Occurrences of a DTMF tone | 0 | 0 | 0 | 1 | # | * | 9 | 8 | 7 | 6 | 5 | 4 | 3 | 2 | 1 | 0 |
| 3) 0 or more occurrences of a DTMF tone | 0 | 0 | 1 | 0 | # | * | 9 | 8 | 7 | 6 | 5 | 4 | 3 | 2 | 1 | 0 |
| 4) Register Termination with ")" | 0 | 0 | 1 | 1 | | | | | | | | | | | | |
| 5) Begin Storing Register | 0 | 1 | 0 | 0 | # | * | digit count: 1–31 or off | | timer; 1–31 secs or off | | | | | | | |
| 6) Match of Intercept Dial Sequence and ODS | 0 | 1 | 0 | 1 | ODS #(0–7) | | | | | | | | | | | |
| 7) Begin List Matching | 0 | 1 | 1 | 0 | Bits indicating which list to match L(0–11) | | | | | | | | | | | |
| 8) Intercept Sequence Termination Method | 0 | 1 | 1 | 1 | # | * | digit count 1–31 digits or off | | timer; 1–31 seconds or | | | | | | | |
| 9) Match DTMF 0 or More Termination Method | 1 | 0 | 0 | 0 | | | digit count: 1–31 digits or off | | | | | | | | | |
| 10) No Digit Timer | 1 | 0 | 0 | 1 | | | | | timer: 1–31 seconds | | | | | | | |

TABLE 5

Get DTMF Command

| Get DTMF Command | | | | | | | |
|---|---|---|---|---|---|---|---|
| Type Bits | | | | Timeout | | | |
| 7 | 6 | 5 | 4 | 3 | 2 | 1 | 0 |
| 0 | 0 | 0 | 1 | 50s of milliseconds (1–15) | | | |

The DTMF command digit is a bit map of Autodialer actions:
DTMF Command

| 3 | 2 | 1 | 0 |
|---|---|---|---|
| 0 | s | d | c | where:

if bit c is 1, the Autodialer resets the Current Alternate 800 Number.

if bit d is 1, the Autodialer sends its Dialtone Acquisition Length.

if bit s in 1, the Autodialer performs Security Functions (reserved for future release).

TABLE 6

Outgoing Dial Sequences - Encoded

| TYPE | TYPE BITS | | | | DATA | | | |
|---|---|---|---|---|---|---|---|---|
| | 7 | 6 | 5 | 4 | 3 | 2 | 1 | 0 |
| DTMF TONE | 0 | 0 | 1 | 0 | Digit value | | | |
| H - (on-hook) | 0 | 1 | 0 | 0 | 0 | 0 | 0 | 0 |
| K - offhook and wait for dialtone | 0 | 1 | 0 | 0 | 0 | 0 | 0 | 1 |
| X - cut through | 0 | 1 | 0 | 0 | 0 | 0 | 1 | 0 |
| T - offhook, wait for dialtone, roll the current alternate 800 number and perform cut through if dialtone is not detected. | 0 | 1 | 0 | 0 | 0 | 0 | 1 | 1 |
| Wait Seconds | 0 | 1 | 1 | 0 | Seconds (1–15) | | | |
| Wait 50 ms | 1 | 0 | 0 | 0 | 50 ms x (1–15) | | | |
| Register in ODs | 1 | 0 | 1 | 0 | Register 0–4 | | | |
| Alternate 800 Number Dialing | 1 | 1 | 0 | 0 | N/A | | | | where:
digit value for DTMF Tones 1–9 is 1–9
digit value for DTMF Tone 0 is 10
digit value for DTMF Tone * is 11
digit value for DTMF Tone # is 12
digit value for DTMF Tone A is 13
digit value for DTMF Tone B is 14

TABLE 6-continued

Outgoing Dial Sequences - Encoded

| | TYPE BITS | | | | DATA | | | |
|---|---|---|---|---|---|---|---|---|
| TYPE | 7 | 6 | 5 | 4 | 3 | 2 | 1 | 0 | digit value for DTMF Tone C is 15
digit value for DTMF Tone D is 0

What is claimed is:

1. An autodialer for interfacing between a user telephonic device and a central office comprising:

a DTMF transceiver for decoding DTMF tones from calls received from said central office and said user telephonic device and transmitting DTMF tones;

a memory storage device for storing program instructions, said program instructions including intercept digit sequences and outgoing dial sequences, said intercept digit sequences including at least one intercept expression for comparison against one or more DTMF digits received in an outgoing telephone call, a match designator following said intercept expression indicating a match condition upon satisfying said intercept expression, and an outgoing dial sequence designator, said intercept expressions include single digit and multiple digit comparison expressions, said single digit expressions for comparison with a single received DTMF digit, and said multiple digit expressions for comparison against two or more received DTMF digits; and a microprocessor connected to said DTMF transceiver, said microprocessor for executing said program instructions stored within said memory storage device, such that upon initiation of an outgoing telephone call from said user telephonic device, said microprocessor executes said intercept digit sequences as each incoming digit is received, seeking a match, whereupon said microprocessor executes an outgoing dial sequence.

2. The autodialer of claim 1 wherein said microprocessor sequentially executes said intercept digit sequences as each incoming digit is received.

3. The autodialer of claim 1 further including an isolation relay for isolating one of said user telephonic device and said central office from said autodialer.

4. The autodialer of claim 1 further including storage means for storing received digits from said outgoing telephone call.

5. The autodialer of claim 4 wherein said outgoing dial sequence accesses said stored received digits and includes at least a portion of said digits received in said outgoing telephone call.

6. The autodialer of claim 5 wherein said outgoing dial sequence includes a first telephone number, said first telephone number accessing an alternative telephone service, said alternative telephone service providing a dial tone back to said autodialer allowing an alternate route for said outgoing telephone call.

7. The autodialer of claim 6 further including an alternate telephone number pointer and one or more alternate telephone numbers stored in said memory device, said alternate telephone number pointer pointing to a location in memory where data associated with a current alternate telephone number may be found, said microprocessor dialing said current alternate telephone number upon failing to receive a dial tone from said service after dialing said first telephone number.

8. The autodialer of claim 1 wherein said multiple digit comparison expressions include list expressions, said list expressions defining one or more lists each comprising at least one element for comparison against received DTMF digits, said list expressions satisfied upon a match of said incoming received DTMF digits with an element of said list.

9. The autodialer of claim 8 wherein each of said elements in said lists are of the same depth.

10. The autodialer of claim 9 wherein said list expressions include lists of different depths.

11. A method for remotely programming an autodialer by a host, said autodialer. connected between said host on a telephone line and a user telephonic device, said autodialer including an isolation relay for isolating one of said user telephonic device and a central office from said autodialer, a DTMF transceiver for decoding DTMF tones from calls received from said central office and said user telephonic device and transmitting DTMF tones, a memory storage device for storing program instructions including intercept dialing sequences and outgoing dial sequences and a microprocessor connected to said DTMF transceiver for executing said program instructions stored within said memory storage device, said method comprising the steps of:

placing a call through to said user telephonic device by said host;

answering said call by said user telephonic device by going off hook;

transmitting a PROGRAM REQUEST command from said host to said autodialer;

upon recognizing said PROGRAM REQUEST command, isolating said user telephonic device so as to configure said autodialer to only monitor DTMF tones received from said host and generating a READY TO PROGRAM response to indicate that the isolation from the user telephone device has been achieved;

transmitting a unique PASSWORD associated with said autodialer in order to verify that a proper host is connected to said autodialer;

if said PASSWORD is incorrect, waiting a predetermined first time delay, then configuring said autodialer to go on hook for a second time delay, hang up on said host, and then releasing said telephone line to the control of said user telephone device, which will hang up on said telephone line;

if said PASSWORD is correct, responding with a PROGRAM MODE response indicating that said autodialer is ready to receive programming data and said host can begin transmitting such data;

transmitting data from said host to said autodialer; and reconfiguring said autodialer by reconnecting said user telephonic device to said telephone line.

12. The method of claim 11 wherein said transmitting step includes:

upon receipt of said PROGRAM MODE response from said autodialer, generating a PROGRAM DATA BLOCK command including a header followed by a data block, said header consisting of a data block size and a starting address in said memory device for storing said data block;

performing a checksum on said PROGRAM DATA BLOCK and transmitting a PROGRAM DATA BLOCK ACKNOWLEDGE back to said host including said checksum;

if the checksum is bad, resending said PROGRAM DATA BLOCK by said host;

if said checksum returned from said autodialer is good, transmitting an EEPROM WRITE command directing said autodialer to store said data block in said memory device;

moving said data block into said memory device and generating a EEPROM WRITTEN response from said autodialer upon completion thereof;

sending a next block of data as required;

upon the last successful data block transfer, transmitting a DOWNLOAD COMPLETE command to said autodialer;

upon receipt of said DOWNLOAD COMPLETE command, calculating a new checksum for said memory device and responding with a DOWNLOAD COMPLETE ACKNOWLEDGE response back to said host; and sending a LOGOUT message to said autodialer to terminate data transfer.

13. The method of claim 11 wherein said reconfiguring step includes said autodialer going on hook for a first time period, hanging up on said host, then releasing said telephone line to the control of said user telephone device, which will hang up on the line.

14. The method of claim 11 wherein said PROGRAM REQUEST command is a fourth column DTMF tone.

15. The method of claim 11 wherein said first time delay is at least several seconds.

16. The method of claim 11 wherein said PASSWORD transmission step includes transmitting a default password in the event that said memory device associated with said autodialer is corrupted, said autodialer responding to said default password only in the event that said memory device has been corrupted.

17. The method of claim 11 wherein said PROGRAM MODE response includes one or more of said autodialer's serial number, a ROM code version number, the programming version number and a calculated checksum of said autodialer's current programming instructions.

18. A memory for storing data for access by an automatic dialing system, said system coupled to a telephonic device and a telephone line, said memory comprising:

a plurality of intercept digit sequences for use in interpreting a dialed number, said dialed number having one of a plurality of patterns, each pattern including one or more DTMF digits, at least one intercept digit sequence including instructions to match said pattern to an associated outgoing dial sequence;

a plurality of outgoing dial sequences, each of said outgoing dial sequences including program instructions including a set of DTMF digits and at least one control sequence for communicating with said telephone line, said control sequence including instructions for monitoring said telephone line for one or more specified DTMF tones, to perform one or more specified delays, and to transmit said set of DTMF digits in a specified sequence; and wherein said system uses said intercept digit sequences to determine one of said outgoing dial sequences applicable for said dialed number and wherein said system uses one of said outgoing dial sequences to establish communication between said telephonic device and said telephone line.

19. The memory of claim 18 wherein said set of DTMF digits of said outgoing dialed number includes none of said DTMF digits of said dialed number.

20. The memory of claim 18 wherein said control sequence includes instructions to detect a DTMF tone indicating lack of a dialtone when transmitting a first set of DTMF digits representing a primary access phone number to said telephone line and to transmit a second set of DTMF digits representing an alternate access phone number.

21. The memory of claim 18 wherein said system receives said plurality of intercept digit sequences and said plurality of outgoing dial sequences for storage in said memory from a remote user interface.

22. The memory of claim 18 wherein said memory is a programmable memory device.

* * * * *